B. A. LINDERMAN.
WOODWORKING MACHINE.
APPLICATION FILED MAY 21, 1917.

1,279,559.

Patented Sept. 24, 1918.
9 SHEETS—SHEET 2.

Witnesses:
Inventor:
Bert A. Linderman
By Munday, Evarts, Adcock & Clarke Attys

B. A. LINDERMAN.
WOODWORKING MACHINE.
APPLICATION FILED MAY 21, 1917.

1,279,559.

Patented Sept. 24, 1918.
9 SHEETS—SHEET 5.

Witnesses:

Inventor:

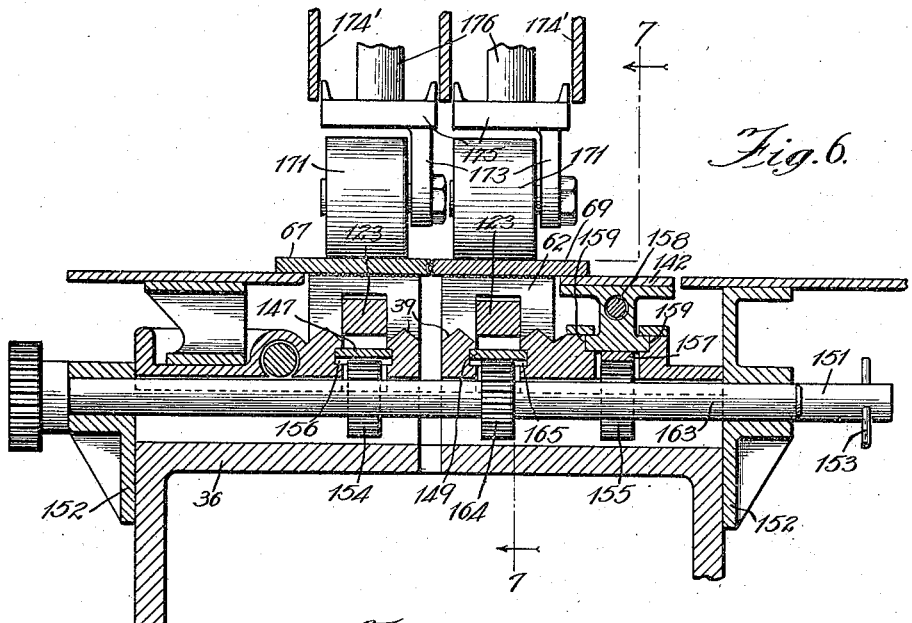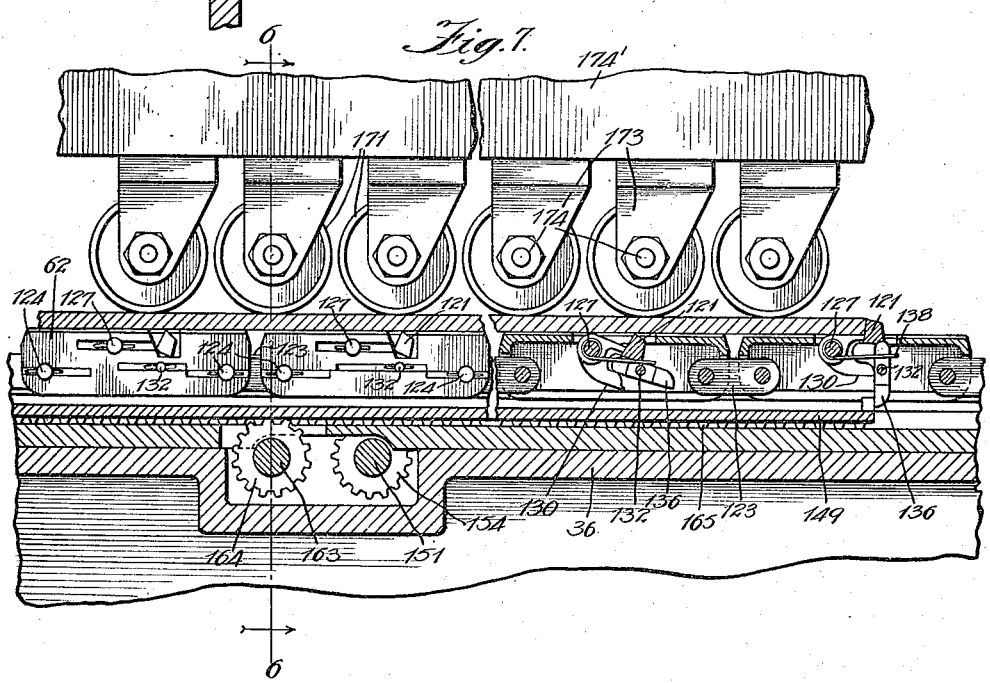

B. A. LINDERMAN.
WOODWORKING MACHINE.
APPLICATION FILED MAY 21, 1917.
1,279,559.
Patented Sept. 24, 1918.
9 SHEETS—SHEET 7.
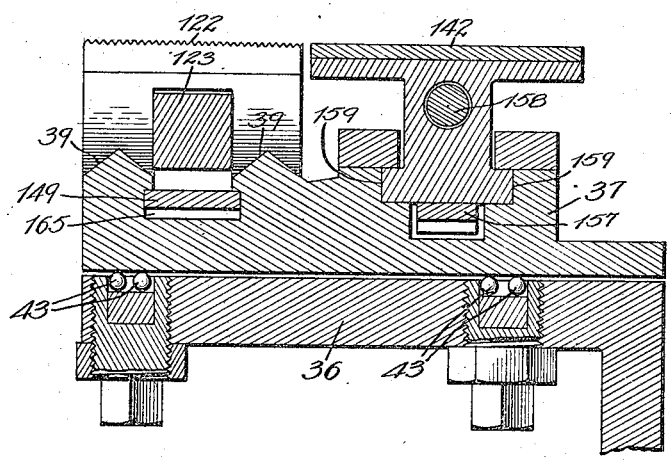
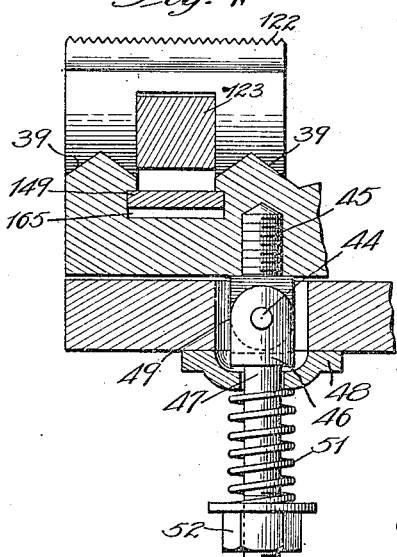
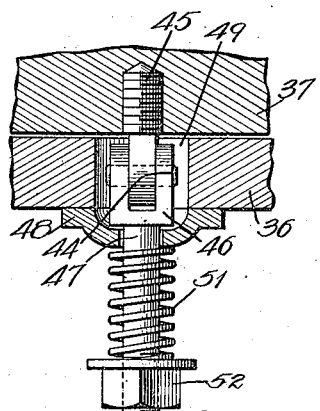
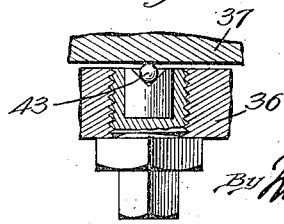

B. A. LINDERMAN.
WOODWORKING MACHINE.
APPLICATION FILED MAY 21, 1917.
1,279,559.
Patented Sept. 24, 1918.
9 SHEETS—SHEET 8.
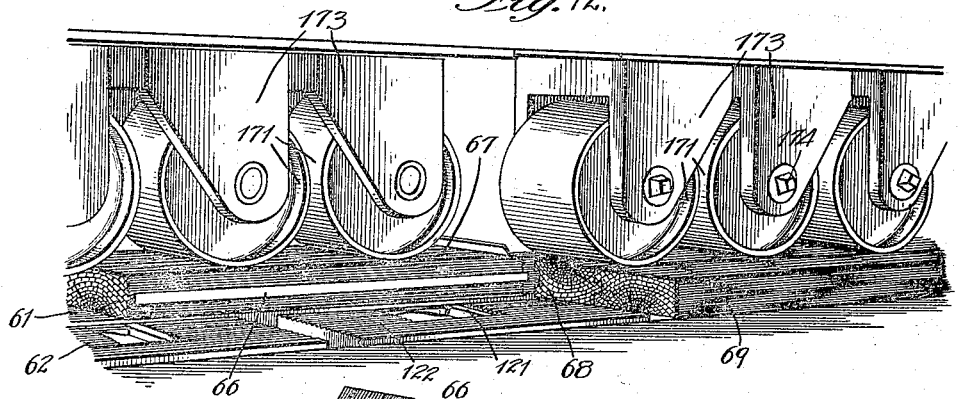
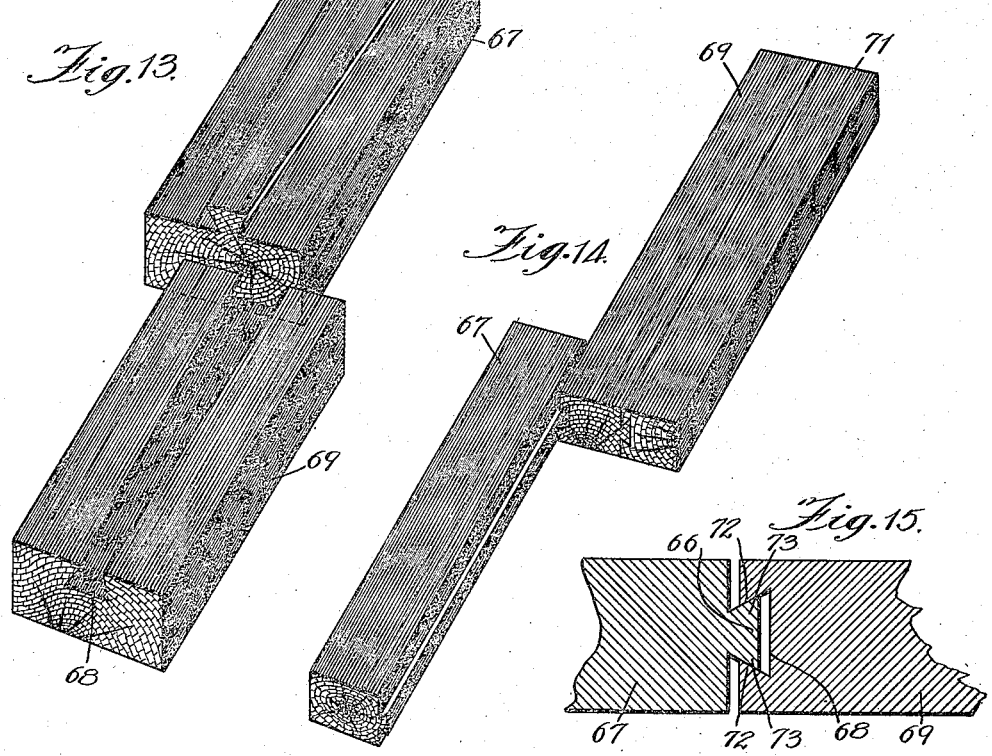

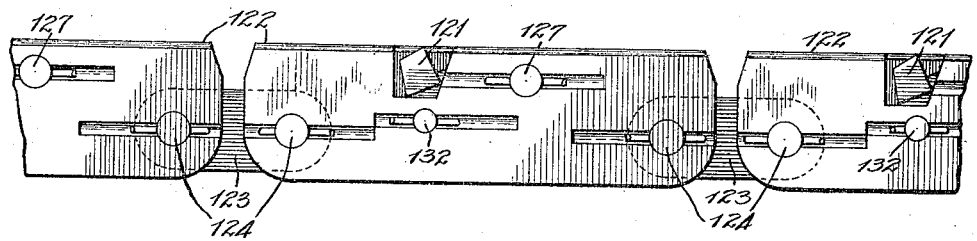
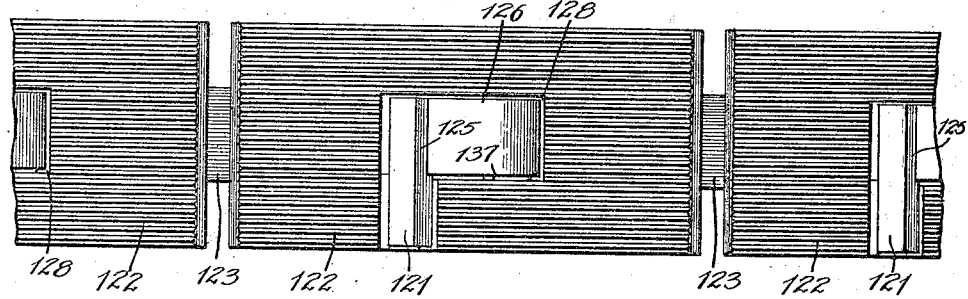
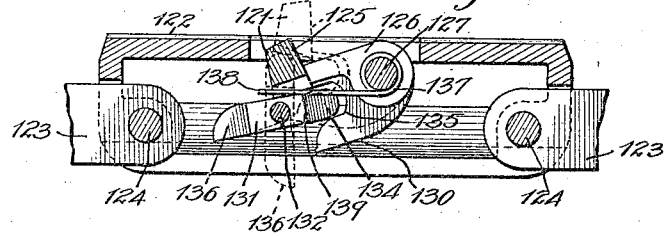
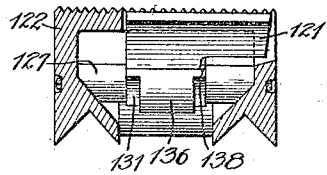

UNITED STATES PATENT OFFICE.

BERT ARTHUR LINDERMAN, OF MUSKEGON, MICHIGAN.

WOODWORKING-MACHINE.

1,279,559.   Specification of Letters Patent.   Patented Sept. 24, 1918.

Application filed May 21, 1917. Serial No. 169,834.

*To all whom it may concern:*

Be it known that I, BERT A. LINDERMAN, a citizen of the United States, residing in Muskegon, in the county of Muskegon and State of Michigan, have invented a new and useful Improvement in Woodworking-Machines, of which the following is a specification.

My invention relates in general to woodworking machines and has for its object broadly the provision of a dovetailing machine of new and improved construction for forming the dovetails in the members to be joined, applying the glue and accurately joining them together.

My present invention has more particular reference to that part of such a machine, which, after the dovetail tongue and grooves have been cut and the glue applied, brings the pieces into final interlocked relation.

A principal object of this invention is the provision of a dovetailing machine which will connect the tongue or tongues of one piece with the groove or grooves of another without scraping the glue from the faces of the pieces adapted to be brought into substantial contact and without subjecting the tongue and groove edges to undue tension or pressure.

The machine hereafter described and embodying my invention is particularly adapted to work upon boards or other members provided with longitudinally extending tongues and grooves of accurately tapering shape. The invention contemplates the provision of a mechanism for introducing the small end of the tapered tongue or tongues into the large ends of the tapered groove or grooves and thence moving the members longitudinally with respect to each other to bring the ends into substantial alinement with a tight permanent joint between the adjacent edges, tongued and grooved together. It also contemplates such an operation of this mechanism as will prevent in large measure, if not entirely, the drawing of the two members together through an interengagement of the tongues and grooves, by feeding the members gradually and slightly toward each other as they move relatively longitudinally into final relative positions.

Numerous other objects and advantages of the invention will be apparent as it is better understood from the following description when considered in connection with the accompanying drawings illustrating a preferred embodiment thereof.

The machine shown on the drawings and embodying this invention is of the same general type, except as will be hereinafter pointed out, as that described in my earlier Patent No. 976,192, granted to me on the 22nd day of November, 1910, for improvements in machines for dovetailing and joining lumber, and only the central portion, which is the portion in which are incorporated the improved and novel mechanism, parts and devices embodying the present invention, is shown on the drawings, on which—

Figs. 6 and 7 are enlarged, detail, sectional views taken centrally of the machine and at substantially right angles to each other, Fig. 6 being on the line 6—6 of Fig. 7 and Fig. 7 on the line 7—7 of Fig. 6.

Figure 3:
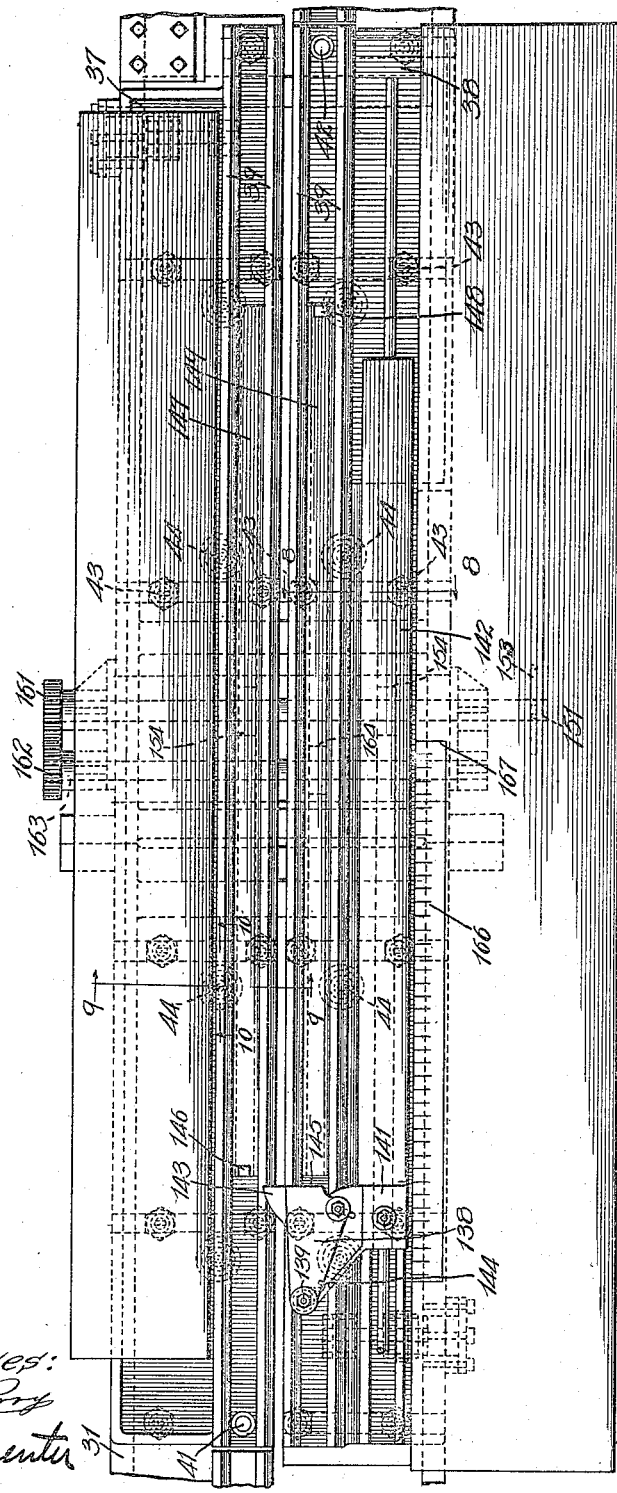
Fig. 3 is a partial, top plan view of this portion of the machine with certain parts removed.

Fig. 8 is an enlarged, sectional view taken substantially on the line 8—8 of Fig. 3.

Fig. 9 is a partial section taken substantially on the line 9—9 of Fig. 3.

Fig. 10 is a section taken substantially on the line 10—10 of Fig. 3.

Fig. 11 is a detail, sectional view showing the mountings of the bearings for the shiftable tables.

Fig. 12 is a perspective view showing the relation of the pieces being operated upon to the conveyers and pressure rolls.

Fig. 13 is a view showing the form of tongue and grooved members adapted to be produced and operated upon by the machine.

Fig. 14 shows an operation in the assembling of these pieces or boards.

Fig. 15 is a transverse, sectional view showing the relation of two adjacent edges thereof when the joining operation is partially completed.

Fig. 16 is a side elevation of a portion of one of the conveyer chains.

Fig. 17 is a top plan view of the same.

Fig. 18 is a vertical, central section through this conveyer; and

Fig. 19 is a transverse, central, vertical, sectional view of one of the conveyer links or blocks.

Figure 4:
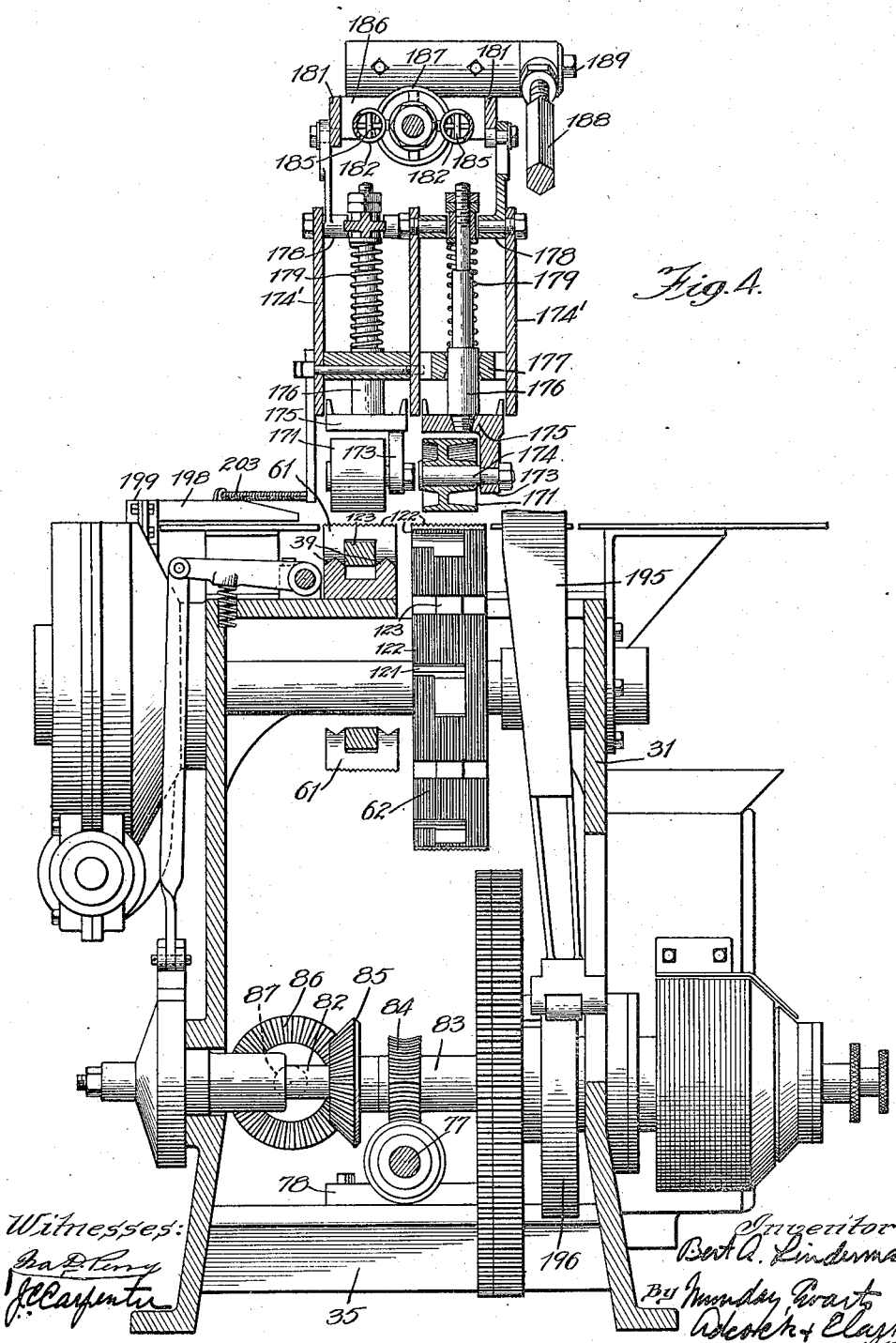
Fig. 4 is a transverse, vertical, sectional view taken substantially on the line 4—4 of Fig. 1.
Figure 5:
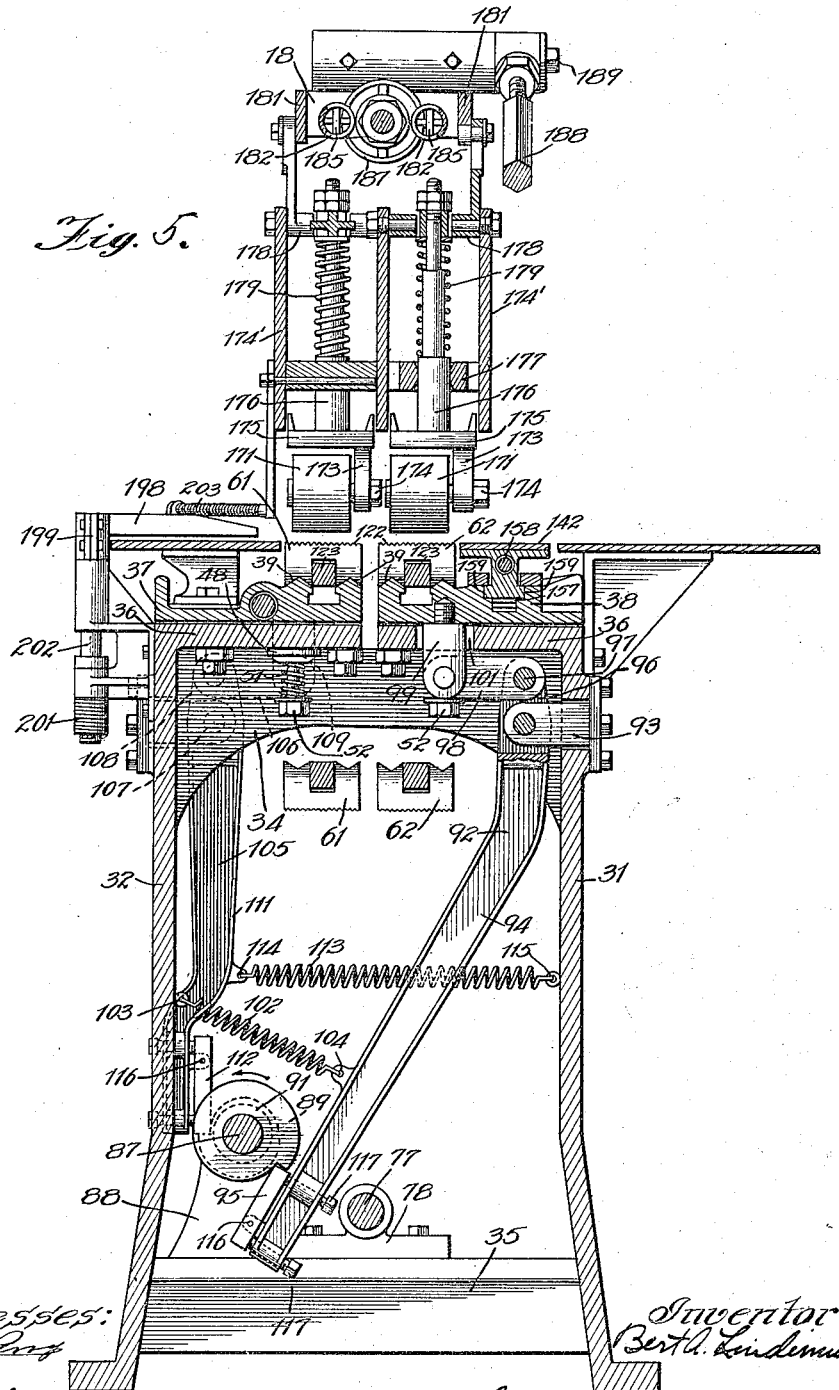
Fig. 5 is a similar view taken substantially on the line 5—5 of Fig. 1.

The machine embodying my invention and shown on the drawings is supported in a suitable frame or housing 31, (Figs. 1 to 5), which in the present instance consists of two heavy castings 32 which are joined together in any suitable fashion and having meeting webs 34 and 35. Above the webs and extending inwardly, are flat, horizontal members 36 together forming a supporting table for certain of the moving parts, as will be later described. On each of these members 36 is mounted a shifting table 37, 38, the table 37 being mounted at the rear side of the machine and the table 38 at the forward side. The tables 37 and 38 are relatively long and are each provided with a pair of guides or tracks 39 extending longitudinally thereof, said guides or tracks 39, being disposed at the adjacent, longitudinal edges of the tables 37 and 38. The table 37 is pivoted at one end at 41 to its member 36 and the table 38 is pivoted at the other end to its member 42, the pivots 41 and 42 being arranged adjacent the adjacent longitudinal edges of the tables 37 and 38 so that movement of these tables about their pivots will bring them toward each other without materially altering the parallel relation of the longitudinal edges. To enable the tables to move easily toward each other from the normal position shown in Fig. 3 and back again to this normal position, ball-bearings 43 (Figs. 3, 8 and 11) are provided at intervals and the tables 37 and 38 are steadied in this movement by the swinging toggle connections 44 (Figs. 3, 9 and 10), each of these connections comprising a stud 45 threaded into the table 37 or 38 and pivoted to the bifurcated head 46 of a stud 47 extending through a cap 48 beneath the table 36 into a recess 49 in the member 36. A spring 51 embraces each stud 47 and proper compression is put in this spring by nuts 52 threaded on the ends of the studs, the size of the recess 49 being such as to permit the small necessary movement of the tables 37 and 38 about their pivots. A conveyer 61 moves on the track 39 of the table 37 from left to right viewing Figs. 2 and 3 and a conveyer 62 moves on the track 39 of the table from right to left, viewing these figures. Each of these conveyers is continuous and moves from the end of the machine at the beginning of its upper travel to beyond the farther end of its table 37 or 38, being returned upon itself, as indicated in Figs. 4 and 5 beneath the tables 37 and 38 and beneath, also, the horizontal members 36 and webs 34, suitable motive power being provided to actuate these conveyers continuously. The means for moving the conveyers is located adjacent the ends of the machine and is not shown, forming no part of my present invention. These conveyers feed the boards or members to be joined together, from opposite ends of the machine, the members being either tongued and grooved before reception by the conveyers or while on the conveyers and before arriving at the central portion of the machine shown on the drawings, it only being necessary for the purposes of this invention, that the proper cutting be done to produce the desired tongues and grooves and that glue be applied before the boards or members arrive at the tables 37 and 38. The invention also has considerable value where glue is not used, in that the use of a machine embodying it insures that the tongues and grooves will not be damaged in the joining. The form of tongues and grooves desirable is best shown in Fig. 13, it being understood that the shape of the members in this figure and in other figures, may be varied as desired. Viewing Fig. 13, it will be noted that a tapering tongue 66 is provided longitudinally of a member 67 and a tapering groove 68 is provided longitudinally of a member 69. In Fig. 12 is shown the relative positions of the members 67 and 69 before being joined together, it being understood that glue has been previously applied in the groove or on the tongue or both in the groove and on the tongue. From this view it will be noted that the conveyer 61 moving toward the right is about to present the small end of the tongue 66 in the large end of the groove 68, further movement of the members 67 and 69 bringing them into the position shown in Figs. 14 and 15. If the boards thus being joined together were left free to move the tapered form of the interengaging tongue and groove would draw them together into the tight fit shown between the member 69 and the member 71 shown connected therewith by a tongue and groove connection. This movement has been found to have scraped a large part of the glue from the interengaging parts and to have imposed too great strains on the interengaging corners 72 and 73, particularly when proper pressure is maintained on the boards during joining to take out any spring or warp that may be present. The swinging movement of the tables 37 and 38 is only sufficient to give the necessary transverse relative movement of the two boards or members being joined together necessary to bring them into final position, and mechanism is arranged to produce this transverse relative movement of the boards or pieces positively at a rate that will insure against the scraping off of the glue from the surfaces to be joined.

The movement of the tables 37 and 38 carry with them the conveyers on which the boards are mounted and this movement is produced as will now be described. A power shaft 74, mounted in bearings in the side plate 31 of the main frame carrying a pulley 76 and in suitable driving connection with the shaft 77 mounted in bearing 78 upon the cross members or webs 35, is driven continuously. A suitable clutch, not shown but adapted to be operated by the operating handle 81, is provided to connect and disconnect the pulley 76 and the shaft 74. A transverse shaft 82 (Fig. 4) through a sleeve 83, drives the shaft 77 by a worm and gear connection 84. The shaft 82 is driven by shaft 74 through gear connection 80. Mounted also on the shaft 82 is a beveled gear 85 meshing with a beveled gear 86 on the end of a shaft 87. The shaft 87 is supported in suitable bearings 88 and extends longitudinally of the machine. This shaft carries two cams 89 and 91, as shown in Fig. 5, the cam 91 being located beneath and near the free end of the table 38 and the cam 89 beneath and near the free end of the table 37. A lever 92 is pivoted to an inwardly extending arm 93 secured to the front wall of the frame of the machine and consists of a long downwardly and inwardly extending arm 94 having at its end a bearing member 95 engaging the cam 91 and a short arm 96 extending upwardly above the arm 93 and pivotally connected at 97 by a link 98 to a stud 99 extending downwardly from the free end of the table 38 through a slot 101 in the forward member 36. The cam 91 is of the shape shown in Fig. 5 and this cam rotates in the direction of the arrow shown on the drawing. Viewing this figure it will be noted that movement of the cam will swing the long arm 94 downwardly and toward the right slowly, imparting thereto a much slower movement of the short arm inwardly to move the table 38 toward the table 37. A spring 102 secured at one end at 103 to the rear part of the frame and at the other end at 104 to this long arm 94, holds the lever against the cam and causes it to quickly move the member 95 into the low part of the cam at a predetermined point in the cam travel. The cam 89 acting through a lever 105 and a link 106 moves the table 37 toward the table 38 as the table 38 moves toward the table 37. This lever is pivoted at 107 in an arm similar to the arm 93 and the link 106 pivotally connects its short arm 108 with a downwardly extending stud 109 secured to the free end of the table 37. The long arm 111 of the lever 105 is provided with a cam engaging element 112 which rides upon the cam 89. A spring 113 connected at one end 114 to the long arm of this lever and at the other end 115 to the front wall of the frame holds the cam engaging element 112 against the cam 89. As will be noted, these cams are arranged to produce simultaneous action of the tables, the relatively long arms operating through the relatively short arms, cause a very small movement of the tables toward each other as the tongue or tongues of one board are carried into and through the groove or grooves of the other. This movement occupies any period of time, substantially the time taken to join the two boards together, so that a gradual movement of the boards toward each other is produced, which movement holds the surfaces to which glue has been applied from coming prematurely in contact to scrape off the glue. The cam-engaging members 95 and 112 are adjustably connected to their respective levers, being pivotally mounted on ears 116 and adapted to be gradually positioned by set screws 117, two such set screws being positioned through the end of each lever, one on each side of the pivotal connection of the cam-engaging member with the lever.

The two boards to be joined are held in accurate position upon their respective conveyers by means of dogs 121 (Figs. 7 and 16 to 19) with which the conveyers are provided. These conveyers in the present instance consist of elongated rectangular members 122 serrated on their outer faces and connected by short links 123 to their pivot pins 124. The links 123 are as short as they can be made to permit the conveyer to make the necessary travel, and the members 122 are given an appreciable length, eight inches being at present thought to be the best dimension for general work. Each member 122 is provided with a dog 121 adapted to be lifted behind the stock and carry it forward as the conveyer moves. Automatic means may, if desired, be provided for causing appropriate dogs to elevate, such mechanism being, however, not shown, as it forms no part of this invention. Each of the dogs 121 consists of a metal member having a flat forward face 125 and a forwardly extending arm 126 which is pivoted on a pivot pin 127 extending transversely of the member 122, the central portion of the member being cut away as indicated at 128 to permit positioning and operation of the dog. A dog-controlling member 131 is pivoted at 132 beneath the body of each dog and this member consists of a rounded end 134 taking into a recess 135 in the arm 126 of the dog and a stop engaging end 136 adapted to move the dog from operative to inoperative position. A spring 137 coiled about the pivot pin 127 and provided with a forwardly extending arm 138 is positioned to bear against a shoulder 139 of the dog when the dog is in vertical position, which is the position retaining the stop elevated, this spring serving to prevent inadvertent dropping of the dog during operation of the machine. The dogs are moved to operative position by a cam face 130 on the arm 126 through engagement of a suitable stop which is intermittently operable but which is not shown as it is believed to be unnecessary to an understanding of this invention.

The portions of the machine and of its parts are so arranged that the two boards will meet in completely joined condition at substantially the center of the machine and means are provided which will now be described to positively insure accurate engagement and to release the dogs at the proper time. A stop 138 is pivotally mounted at 139 on a slide 141, (Fig. 3) which slide is secured to an end of a longitudinal movable table 142 positioned alongside the track 39 of the table 38. A board being carried by the conveyer 61 which enters from the left in Fig. 3 will engage an outwardly extending lip 143 on the stop 138 and swing the stop about its pivot out of the way of the board, a spring 144 being provided to move the stop back into the position shown after the board has passed. At this point in the operation, it is intended that the dog behind the board entering from the left be released and the two boards which at this time are in engagement substantially throughout their length be brought together against the stop 138, the stop having a flat forward face 145 for the purpose of bringing the transverse edges of the two into accurate alinement. The dogs of the conveyer 61 are released by a trip 146 extending upwardly from the end of a slide 147, as seen in Fig. 3, it being noted that this trip is located just beyond the stop 138 so that the board will pass the stop before the dog moving it is released. A similar stop 148 is provided to trip the dogs of the conveyer 62 (the conveyer moving in the opposite direction) just as the boards come in contact with the stop so that the conveyers may move on without carrying the material with them. The trip 148 is mounted on the slide 149 and a controlling device, which will now be explained, is provided to move both the trips and the stop conjointly to adjust the device for any length of board. In this connection, attention is called to Figs. 3 and 6. A shaft 151 extends transversely of the machine and is mounted in brackets 152 on opposite sides. This shaft carries, at the operator's side of the machine, outwardly extending fingers 153 adapted to be grasped by the operator to turn the shaft and alter the adjustment. Mounted upon the shaft beneath the slide 147 and beneath the table 142 are gears or pinions 154 and 155 which mesh respectively with teeth of racks 156 and 157 provided respectively on the undersides of the slide 147 and the table 142. These pinions or gears are of like diameter and cause the stop 138 and the trip 146 to move longitudinally of the machine without relative change of position. A rod 158 suitably supported forms a guide for the movement of the table and this table slides in suitable grooves 159. Upon the end of the shaft 151 a pinion 161 is provided and this pinion meshes with a pinion or gear 162 upon the end of a shaft 163 extending through the bearings 152 in parallelism with shaft 151, the pinions 161 and 162 being of like diameter so that rotation of the shaft 151 imparts a like and equal rotation to the shaft 163. This shaft carries the pinion 164 in mesh with a rack 165 beneath the slide 149 so that when the slide 147 and table 142 move to the left, viewing Fig. 3, the slide 149 will have an equal movement to the right and vice versa. This maintains the parts in proper adjustment with relation to the center of the machine and enables a single turning of the shaft 151 to effect such adjustment as may be desired, a scale 166 being mounted on a fixed part of the machine to determine the proper position of the stop and trips for a given length of material, it being intended that the stop be located from the end 167 of this scale a distance equal to the length of finished product.

In order that the material may be maintained in flat position while the tongues and grooves are interengaging, a plurality of pressure rolls 171 are provided and suitable devices are provided for moving these rolls out of engagement with the stock when the two boards have been brought up against the stop 138. This portion of the mechanism forms no part of my present invention and it is not believed to need detailed discussion. It may be pointed out, however, that the rolls are secured upon ears 173 by pivot pins 174, the ears 173 depending from a movable slide 175 formed on the end of a spring pressed rod 176 so that the rollers are yieldingly held in firm engagement with the stock. The rods 176 pass through bearings 177 and 178 between which are positioned springs 179.

Figure 1:
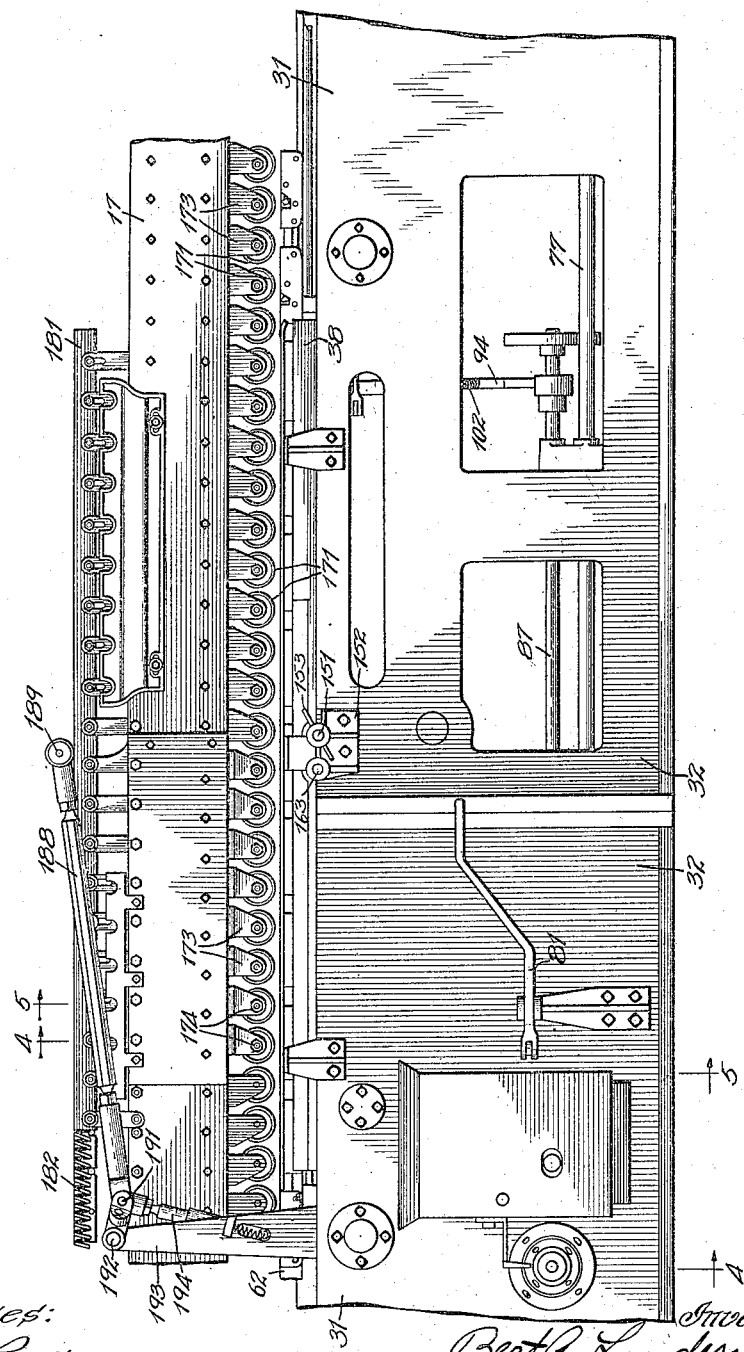
Figure 1 is a front side elevation of the central portion of a machine embodying my invention.
Figure 2:
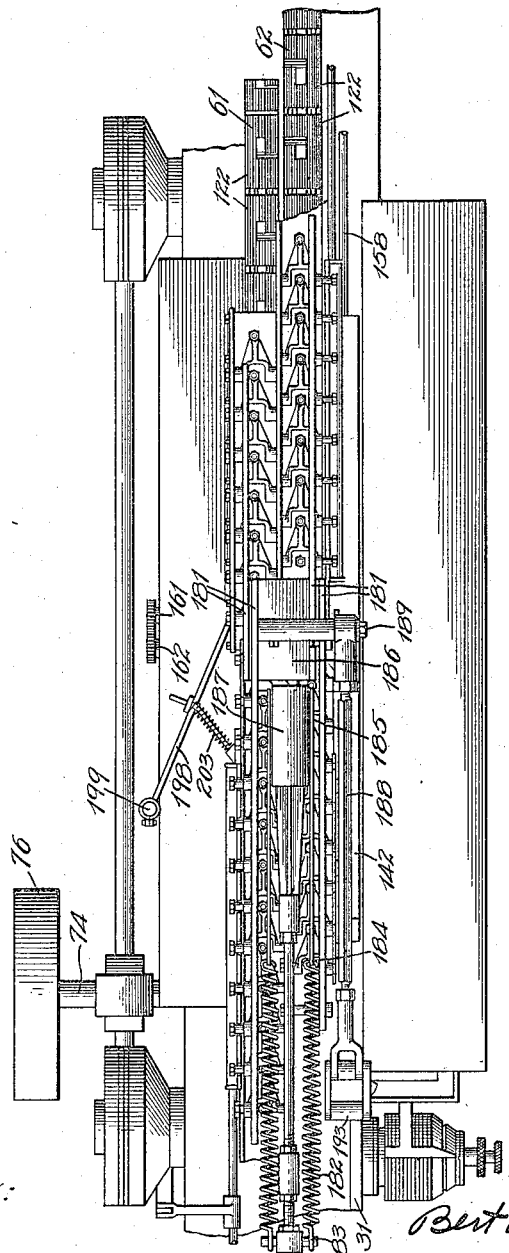
Fig. 2 is a top plan view of the same.

The rollers positioned above the central part of the machine or the part occupied by the stock after being joined together are adapted to be moved up out of the way, being connected to bars 181 normally pulled toward the left, viewing Figs. 1 and 2, by springs 182, which springs are connected at one end 183 to a suitable stationary member and at the other 184 to bars 185 secured to a cross member 186 to which the bars 181 are fastened. A dash pot 187 is provided to take the jar from too sudden movement of the rollers. The rollers located above the central portion of the machine are lifted when the two boards have been joined together to permit the boards to be ejected, as will be later described. This lifting of the rollers is accomplished by a link 188 pivotally connected at 189 with the bars 181 and with a link 191 pivoted at 192 on a support 193. Pivoted also to the link 191 is a lever 194 (Figs. 1 and 4) one arm of which, 195, rides upon a cam 196 on the shaft 83, the lever 194 and cam 195 being so arranged that at each revolution of the cam the lever will be swung to move the link 188 and lift the rollers from the stock. As soon as this occurs an ejector 198 pivoted at 199 on the main frame (Figs. 2 and 5) comes into action to move the joined stock off the conveyers toward the front of the machine where it is received and removed by a workman. A spring 201 embracing the pivot rod 202 which is rigid with the ejector arm 198 is provided to swing the arm toward the stock. This spring is not sufficiently strong to disturb the position of the stock through pressure exerted against it by the arm when the rollers are in operation but is of sufficient strength to move the finished product from the machine when the rollers are lifted. A buffer 203 is provided to prevent too sudden action of the ejector when the rollers are lifted and to prevent the ejector from swinging too far across the path of the board entering from the left in the next joining operation. The ejecting mechanism and the pressure rollers together with the means for operating them, form no part of my present invention and are therefore merely generally indicated on the drawing and have only been briefly described.

It will be manifest that the movement given the tables 37 and 38 as the boards come together with the tongue or tongues of the one in engagement with the groove or grooves of the other will prevent scraping off of the glue and any undue pulling strain on the parts which might injure the interlocking edges, as for instance the pulling off of the tongue or the lips forming the dovetail groove.

It is thought that the invention and many of its attendant advantages will be understood from the foregoing without further description and it will be obvious that various changes may be made in the form, construction and arrangement of the parts of the invention without sacrificing any of the material advantages, the form hereinbefore described being merely a preferred embodiment thereof.

I claim:

1. In a dovetailed joining machine, the combination of means for moving two members to be joined longitudinally in opposite directions, and means for shifting said members transversely as they join.

2. In a dovetailed joining machine, the combination of means for moving a member to be joined longitudinally of the machine, means for positioning the second member to be joined and means for shifting one of said members transversely in relation to its longitudinal movement as it joins the other member.

3. In a dovetailed joining machine, the combination of means for shifting one of the members to be joined longitudinally of the machine and applying pressure thereto to maintain it in a flat condition, means for presenting a second member to be joined in appropriate position and means for shifting one of said members transversely and longitudinally simultaneously as it joins the other.

4. In a dovetailed joining machine, the combination of means for moving two members to be joined toward each other and longitudinally of the machine to engage the tongue of one with the groove of the other and means for moving them toward each other transversely of the machine as they come in the final position.

5. In a machine for joining members having tapering tongue and grooved edges, the combination of oppositely moving means adapted to insert the small end of the tongue in the large end of the groove and means for maintaining said members in predetermined relation during the formation of the joint.

6. In a machine for joining members provided with tapered tongue and tapered groove edges, the combination of means for moving said members oppositely to insert the small end of the tongue in the large end of a groove and means for positively controlling the movement of said members toward each other as the tongue enters the groove.

7. In a machine for joining members having tapered tongue and tapered grooved edges, the combination of means for moving said members oppositely to insert the small end of the tongue of one member in the large end of the groove of the other, and means for moving said members toward each other at a predetermined rate as the tongue of one member passes into the groove of the other, said last mentioned means being arranged to prevent the removal of glue placed on the tongue of the one by scraping against the edge about the groove of the other.

8. In a machine for joining members provided with tapered tongue and tapered groove edges, the combination of means for moving said members oppositely to insert the small end of the tongue in the large end of a groove, means for positively controlling the movement of said members toward each other as the tongue enters the groove, and means for pressing said members into substantially flat condition throughout the operation.

9. In a machine for joining members having tapered tongue and tapered grooved edges, the combination of means for moving said members oppositely to insert the small end of the tongue of one member in the large end of the groove of the other, means for moving said members toward each other at a predetermined rate as the groove of one member passes into the tongue of the other, said last mentioned means being arranged to prevent the removal of glue placed on the tongue of the one by scraping against the edge about the groove of the other, and means for pressing said members into substantially flat condition throughout the operation.

10. In a machine for joining together members provided with tapered tongue and tapered groove edges, the combination of a pair of oppositely moving parallel conveyers adapted to carry said members in position to bring the small end of the tongue of one member into the large end of the groove of the other, a guide table for each conveyer and means for moving said guide table and said conveyers toward each other to bring said members gradually toward each other at a predetermined rate as the tongue of the one member passes through the groove of the other.

11. In a machine for joining members provided with tapered tongue and tapered groove edges, the combination of a pair of oppositely moving parallel conveyers adapted to move said members toward each other and to insert the small end of the tongue of one member into the large end of the groove of the other, a guide and supporting table over which each of said conveyers travels, said tables being pivoted at the ends and adapted to swing toward each other and to carry with them said conveyers to bring said members toward each other at a predetermined rate as the tongue of the one member passes into the groove of the other.

12. In a machine for joining members provided with tapered tongue and tapered groove edges, the combination of a pair of oppositely moving parallel conveyers adapted to move said members toward each other and to insert the small end of the tongue of one member into the large end of the groove of the other, a guide and supporting table over which each of said conveyers travels, said tables being pivoted at the ends and adapted to swing toward each other and to carry with them said conveyers to bring said members toward each other at a predetermined rate as the tongue of the one member passes through the groove of the other and means for automatically moving said tables.

13. In a machine for joining members provided with tapered tongue and tapered groove edges, the combination of a pair of oppositely moving parallel conveyers adapted to move said members toward each other and to insert the small end of the tongue of one member into the large end of the groove of the other, a guide and supporting table over which each of said conveyers travels, said tables being pivoted adjacent the ends and adapted to swing toward each other and to carry with them said conveyers to bring said members toward each other at a predetermined rate as the tongue of the one member passes through the groove of the other and adjustable means for automatically moving said tables.

14. In a machine for joining members having tapering tongue and grooved edges and which machine enters the smaller end of the tongue of one board into the wider end of the groove of the other board while maintaining the outer face of the tongue spaced from the bottom of the groove, the combination of oppositely moving means adapted to insert the small end of the tongue in the large end of the groove and means for maintaining said members in predetermined relation during the formation of the joint.

15. In a machine for joining members provided with tapered tongue and tapered groove edges, and which machine enters the smaller end of the tongue of one board into the wider end of the groove of the other board while maintaining the outer face of the tongue spaced from the bottom of the groove, the combination of means for moving said members oppositely to insert the small end of the tongue in the large end of a groove and means for positively controlling the movement of said members toward each other as the tongue enters the groove.

16. In a dovetailed joining machine, the combination of means for moving a member to be joined longitudinally in the machine, means for positioning a second member to be joined and means for shifting one of said members transversely a predetermined amount as it joins the other member.

17. A process of dovetailing table tops, which consists in providing them with tapering tongues and grooves extending throughout the length of the adjoining edges, applying glue to the dovetailed surfaces, inserting the small end of the dovetail in the large end of the groove and moving them together lengthwise and maintaining the surfaces of the tongue and groove out of engagement until substantially at the end of the dovetailing operation.

18. A process of joining boards for table tops and the like, which consists in providing elongated tongue and groove on adjoining edges of the boards, applying glue and moving the boards transversely and in advance of movement given them by the formation of their parts.

Signed in the presence of two subscribing witnesses.

BERT ARTHUR LINDERMAN.

Witnesses:
I. F. CHAPIN,
B. C. BOOTH.

Copies of this patent may be obtained for five cents each, by addressing the "Commissioner of Patents, Washington, D. C."